(12) United States Patent
Sestini et al.

(10) Patent No.: US 9,129,250 B1
(45) Date of Patent: Sep. 8, 2015

(54) AUTOMATED INVENTORY MANAGEMENT

(71) Applicant: Amazon Technologies, Inc., Reno, NV (US)

(72) Inventors: Jill Kathleen Sestini, South Berwick, ME (US); Peter K. Mansfield, Bellevue, WA (US); Peter R. Wurman, Acton, MA (US); Jules Cook Graybill, Seattle, WA (US); Ned Lecky, Vashon, WA (US); James Christopher Curlander, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/036,376

(22) Filed: Sep. 25, 2013

(51) Int. Cl.
*G06F 7/00* (2006.01)
*G06Q 10/08* (2012.01)

(52) U.S. Cl.
CPC .................................. *G06Q 10/087* (2013.01)

(58) Field of Classification Search
None
See application file for complete search history.

(56) References Cited

U.S. PATENT DOCUMENTS

| 5,905,653 | A * | 5/1999 | Higham et al. ............... 700/244 |
| 2011/0153614 | A1 * | 6/2011 | Solomon ....................... 707/740 |
| 2012/0143427 | A1 * | 6/2012 | Hoffman et al. ................ 701/23 |
| 2013/0076898 | A1 * | 3/2013 | Philippe et al. .............. 348/143 |

* cited by examiner

*Primary Examiner* — Yolanda Cumbess
(74) *Attorney, Agent, or Firm* — Lee & Hayes, PLLC

(57) ABSTRACT

Some examples include using an inventory tracking device to track the addition of inventory items to an inventory holder of an inventory system or removal of inventory items from the inventory holder. The inventory holder may include one or more trays to store one or more inventory items, with each tray including one or more bins that may be defined by dividers on the tray. The inventory tracking device may use inventory holder configuration data that identifies locations of the bins to determine that the inventory item was added to or removed from a particular bin of the inventory holder.

20 Claims, 5 Drawing Sheets

AUTOMATED INVENTORY MANAGEMENT

BACKGROUND

Modern inventory systems, such as those in mail-order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. For instance, in product distribution centers (e.g., fulfillment centers), vast quantities of products are processed for shipment to consumers traditionally using manual labor and/or mechanical handling equipment (e.g., conveyor systems, forklifts, etc.).

Inventory systems that are tasked with responding to large numbers of diverse inventory requests typically exhibit inefficient utilization of system resources, including space, equipment, and manpower. This can, in turn, result in lower throughput, unacceptably long response times, an ever-increasing backlog of unfinished tasks, and generally poor system performance. Additionally, expanding or reducing the size or capabilities of many inventory systems requires significant changes to existing infrastructure and equipment. As a result, the cost of incremental changes to capacity or functionality may be prohibitively expensive, thereby limiting the ability of the system to accommodate fluctuations in system throughput.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Inventory systems are utilized by many entities for storing and managing inventory. For example, some retailers may utilize a warehouse of inventory holders that store inventory items in various bins. When an order for a specific inventory item needs to be filled by the retailer, a worker typically retrieves the inventory item from the bin where the inventory item is stored.

The present disclosure describes tracking the movement of inventory items within an inventory system. In some implementations, an inventory tracking device may identify an inventory operation (e.g., an operator adding an item to or removing an item from an inventory holder) free from input from the operator. As an illustrative example, the inventory tracking device may include an imaging device to track the movement of the item without input from an operator (e.g., the operator scanning a bar code that is associated with a particular bin on the inventory holder).

The present disclosure describes further describes using an imaging device to determine a configuration of an inventory holder. To illustrate, an inventory holder may include one or more trays, with each tray including one or more dividers that define one or more bins. The configuration of the inventory holder may identify a location of each bin and a bin identifier associated with each bin. The inventory tracking device may use the inventory holder configuration data to determine that an inventory item has been added to or removed from a particular bin of the inventory holder.

Inventory systems of the present disclosure utilize one or more mobile drive units to automatically retrieve inventory holders from warehouse storage. The inventory holders may be entire racks of shelves, with each shelf having bins for various inventory items. Mobile drive units ("MDUs") may be self-powered robotic devices configured to move freely about the warehouse. Inventory holders may be transported by mobile drive units to an inventory station (e.g., a "pick station") for performing various inventory operations.

The ability for mobile drive units to transport inventory items to a station for performing inventory operations rather than or in addition to workers manually retrieving inventory items from stationary inventory holders or adding (e.g., replenishing) inventory items to stationary inventory holders may vastly increase efficiency and productivity of the inventory system. For example, by utilizing mobile drive units, an inventory system may be capable of fulfilling more orders per hour than previous solutions.

This and other examples of operating an inventory system are described below. The techniques discussed herein may be implemented in many different ways, by many different systems. Various representative implementations are provided below with reference to the figures.

Figure 1:
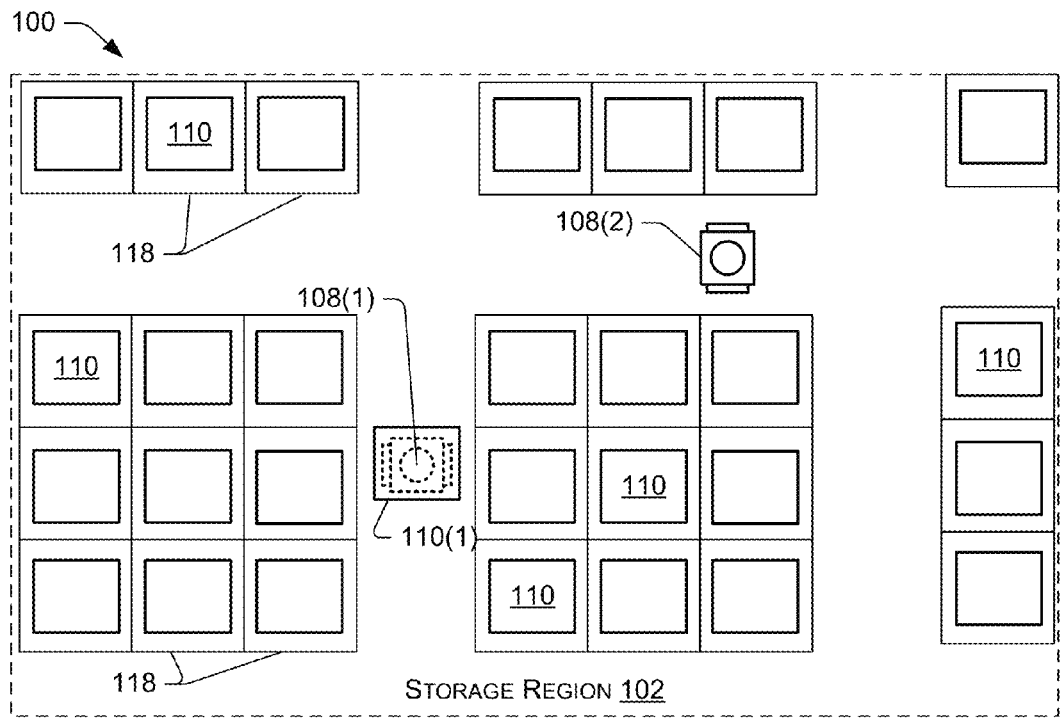
FIG. 1 illustrates an example inventory system having multiple regions and mobile drive units that carry inventory holders about the regions.
Figure 1:
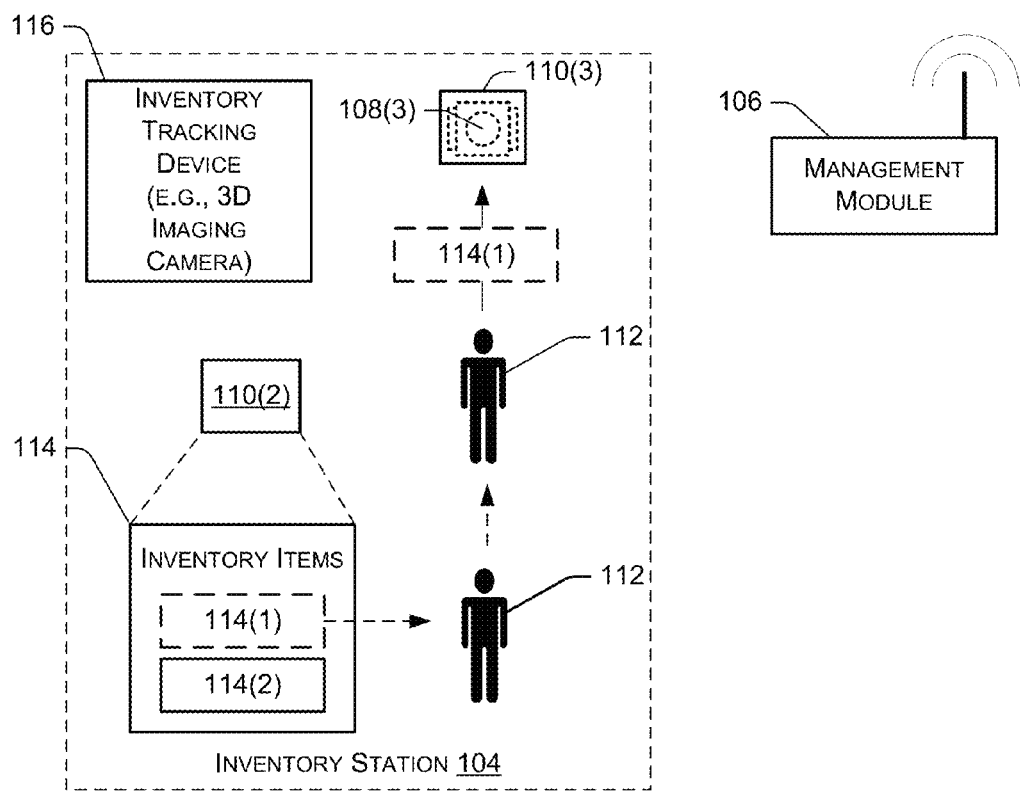

FIG. 1 shows one illustrative example of an inventory system 100 according to some implementations. In FIG. 1, one or more inventory operations (e.g., user-directed replenishment operations) that may otherwise utilize physical identifiers, such as bar codes associated with various inventory storage locations on an inventory holder, may be automatically tracked via an inventory tracking device, such as a three-dimensional (3D) imaging camera.

The inventory system 100 of FIG. 1 may be arranged in a facility or warehouse (e.g., distribution facility, fulfillment center, etc.) that is logically organized into areas or regions associated with various functions. In the illustrated example, the warehouse includes a storage region 102 and an inventory station 104. In practice, depending upon the size of the inventory system 100, the warehouse may hold more than one of the storage regions 102 and inventory stations 104. The inventory system 100 includes a management module 106, multiple mobile drive units 108, and inventory holders 110. Only some of the inventory holders 110 are shown referenced with the number 110 for ease of illustration. Further, in some implementations, an operator 112 may perform one or more inventory management tasks (e.g., item picking or item replenishment) at the inventory station 104. In the example of FIG. 1, an inventory holder 110 includes multiple inventory items 114, and an inventory tracking device 116 may be configured to track movement of the inventory items 114 at the inventory station 104. While FIG. 1 illustrates an example of the operator 112 adding an item 114(1) to the inventory holder 110(3) as part of a replenishment operation, it will be appreciated that the operator 112 may also remove one or more items from the inventory holder 110(3) as part of a picking operation.

In some implementations, one or more mobile drive units 108 are provided in the storage region 102 to transport the inventory holders 110 between the storage region 102 and other regions of the inventory system 110 (e.g., in a warehouse or a manufacturing facility). In the example illustrated in FIG. 1, a loaded mobile drive unit 108(1) is shown in the storage area 102 carrying an inventory holder 110(1), down an aisle between the sets of predefined storage locations 118. An unloaded mobile drive unit 108(2) is also shown moving through an aisle between the predefined storage locations 118.

The inventory station 104 represents a location designated for the removal of inventory items 114 from inventory holders 110, the introduction of inventory items 114 into inventory holders 110, the counting of inventory items 114 in inventory holders 110, and/or the processing or handling of inventory items 114 in any other suitable manner. In the example of FIG. 1, a free-standing inventory holder 110(2) and a loaded drive unit 108(3) docked with an inventory holder 110(3) are shown in the inventory station 104. However, it will be appreciated that the free-standing inventory holder 110(2) in the inventory station 104 may be different from the inventory holder 110(3) that is loaded onto the mobile drive unit 108(3). That is, the free-standing inventory holder 110(2) may include a table, a pallet or other storage area where the inventory items 114 may be accessible to the operator 112 (see e.g., FIG. 2).

In the example illustrated in FIG. 1, the one or more inventory items 114 include multiple inventory items, including at least a first inventory item 114(1) and a second inventory item 114(2). In some implementations, the operator 112 may perform a user-directed replenishment operation involving one or more of the inventory items 114. FIG. 1 illustrates a particular example in which the operator 112 may move the first inventory item 114(1) from the free-standing inventory holder 110(2) to the inventory holder 110(3) that is loaded on the drive unit 108(3) as part of the user-initiated replenishment operation. In this example, the inventory tracking device 116 may be configured to determine that the first inventory item 114(1) has moved to the inventory holder 110(3). Further, in some implementations, the inventory tracking device 116 may identify a particular location within the inventory holder 110(3) in which the operator 112 has placed the first inventory item 114(1). As an illustrative example, the inventory holder 110(3) may include one or more trays, and each tray may include one or more dividers that define bins within a particular tray. Thus, in some implementations, the inventory tracking device 116 may identify a location on the inventory holder 110(3) where the operator 112 has placed the first inventory item 114(1) according to an inventory holder identifier, a tray identifier, a bin identifier, another location identifier, or a combination thereof.

The inventory station 104 may include a barcode scanner (not shown) that the operator 112 may use to scan barcodes attached to inventory items as part of various inventory operations. Further, in some cases, barcodes may be placed at various locations on the inventory holders 110, with each barcode associated with a particular bin. In some cases, for inventory tracking purposes, the operator 112 may first scan a barcode on an inventory item and then scan a barcode on the particular bin of the inventory holder 110 in which the inventory item is to be placed. However, in some implementations of the present disclosure, the inventory holders 110 may not include barcodes to identify the various bin locations. Instead, the inventory tracking device 116 may automatically track where the inventory item is placed in the inventory holder 110. For example, the inventory tracking device 116 may include a 3D imaging device (e.g., a 3D sensing camera) to identify a particular bin where the inventory item has been placed in the inventory holder 110. In some cases, the operator 112 may scan the particular inventory item using a barcode scanner, and the inventory tracking device 116 may identify that an arm of the operator 112 subsequently reaches into a particular bin of the inventory holder 110. That is, the detection of the arm of the operator 112 within the inventory holder 110 indicates to the inventory system 100 that the item has been placed on the inventory holder 110.

In alternative implementations, the 3D sensing camera may capture an initial 3D image of the inventory holder 110 prior to the introduction of inventory items and may subsequently capture another 3D image of the inventory holder 110 after the introduction of the inventory items in order to identify locations where the inventory items have been placed. As another alternative, a position sensing device (e.g., a gaming device that includes position sensing capabilities) may be used to detect that the operator 112 has moved her arm into a particular bin on the inventory holder 110. In this case, the detection of the movement of the arm to a particular bin may indicate to the inventory system 100 that the item 114 has been placed in that particular bin on the inventory holder 110. In some cases, the operator 112 may select a button or other control on the position sensing device when her arm is located within the particular bin to notify the inventory system 100 that the item has been placed in that particular bin on the inventory holder 110. Alternative methods of identifying a location on the inventory holder 110 where an inventory item has been placed may include a light curtain, image recognition, or pressure and/or weight sensors on the inventory holder 110, among other alternatives. As another example, the inventory tracking device 116 may be configured to recognize one or more gestures, and the recognition of a particular gesture by the operator 112 may indicate that the item has been placed in the particular bin on the inventory holder 110. As an illustrative non-limiting example, the operator 112 may close her hand and then open her hand (e.g., within the bin or adjacent to the bin) after moving the item in order to indicate that she is no longer holding the item and that the item has been placed on the inventory holder 110. In some cases, the inventory tracking device 116 may recognize the gesture based on a comparison of a first image of the closed hand to a second image of the open hand and may determine a location of the hand with respect to the inventory holder 110 in order to identify the particular bin where the item was placed.

Each inventory holder 110 may be implemented as a physical structure to hold various inventory items. The inventory holder 110 has a physical length, width, and height that may be standardized or varied within the inventory system 100. As used herein, the inventory holders 110 may be configured to hold essentially any type or size of item or be used for any number of purposes, including, but not limited to, carrying pallets, storing shipping supplies, holding garbage, supporting empty boxes waiting for inventory, supporting filled boxes with items once orders are fulfilled, and so on.

In one implementation, the inventory holder 110 may be formed as a rack having multiple shelves or trays to support various types of inventory items. For instance, the inventory holders 110 may include multiple storage bins with each storage bin capable of holding a different type of inventory item. The inventory holders 110 are capable of being carried, rolled, or otherwise moved by the mobile drive units 108. Each inventory holder 110 may have a plurality of faces, and each bin may be accessible through specific faces. The inventory holder 110 is free-standing when at rest, but can be lifted and moved by the mobile drive units 108. The mobile drive units 108 may be configured to rotate inventory holders 110 at appropriate times to present particular faces of inventory holders 110 and the associated bins to the operator 112 or other components of inventory system 100. One example is described below in more detail with reference to FIG. 2.

Inventory holders 110 may include a plurality of faces, and each inventory item 114 stored in a particular inventory holder 110 may be associated with one or more faces of that inventory holder 110. Inventory items 114 may be accessible only from one of the faces associated with the inventory item 114. For example, inventory holder 110 may include four faces and a plurality of inventory bins. Each inventory bin may be associated with one or more particular faces. In particular, inventory bins located at a corner of inventory holder 110 may be associated with both frame faces forming the corner. In some cases, an inventory bin may only be accessed through the one or more frame faces associated with that inventory bin.

The inventory station 104 may also represent any appropriate components for processing or handling inventory items 114, such as scanners for monitoring the flow of inventory items 114 in and out of the inventory system 100, communication interfaces for communicating with the management module 106, and/or any other suitable components. While FIG. 1 illustrates an example in which the inventory tracking device 116 and the inventory holder 110(3) are located at the inventory station 104, it will be appreciated that one or more of these components of the inventory system 100 may be located adjacent to the inventory station 104. In some implementations, the inventory station 104 may be controlled, at least in part, by a single human operator (e.g., the operator 112) or by multiple human operators. Further, in some implementations, the inventory station 104 may be at least partly automated. Moreover, the human or automated operators of the inventory station 104 may be capable of performing certain tasks to inventory items 114, such as packing or counting inventory items 114, as part of the operation of inventory system 100.

Although "inventory station" as used in the following description refers to locations at which any appropriate processing operation supported by inventory system 100 may be completed, particular embodiments of inventory system 100 may include specialized inventory stations 104 suitable for performing only a single processing task supported by inventory system 100. For example, a particular inventory station 104 may be capable of handling only retrieval requests or only replenishment requests, as defined below. Moreover, a particular embodiment of inventory system 100 may include inventory stations 104 that are, in general, capable of handling multiple types of inventory requests but, at any given time, configured to handle only one particular type of inventory requests.

During operation of a particular embodiment of inventory system 100, the management module 106 receives inventory requests that trigger particular operations within the inventory system 100 including, but not limited to, operations associated with the retrieval, storage, replenishment, and counting of inventory items 114 and/or inventory holders 110.

The management module 106 may receive inventory requests from a human operator or other components of inventory system 100. For example, an operator of the inventory system 100 may manually enter inventory requests using a keyboard coupled to the management module 106. As another example, the management module 106 may receive inventory requests from remote components over a network connection, such as an internet connection.

In executing a replenishment operation, the management module 106 selects an inventory holder 110 and a mobile drive unit 108. After selecting the inventory holder 110, the management module 106 may then select a particular mobile drive unit 108 to transport that inventory holder 110. The management module 106 may use any appropriate criteria, factors, or considerations in selecting mobile drive unit 108. Examples of such factors may include, but are not limited to, the location of mobile drive units 108 relative to the inventory station 104 or the selected inventory holder 110. After the management module 106 has selected an appropriate inventory holder 110 and mobile drive unit 108, the management module 106 may then transmit information identifying the selected inventory holder 110 to the selected mobile drive units 108.

In the example user-directed replenishment operation illustrated in FIG. 1, the operator 112 may identify the first inventory item 114(1) that may be currently located on the inventory holder 110(2) as the inventory item to be replenished. While not shown in FIG. 1, the operator 112 may scan or otherwise identify the first inventory item 114(1), such that the management module 106 may direct a mobile drive unit 108 to retrieve the appropriate inventory holder where the first inventory item 114(1) is to be stored. To illustrate, upon receiving the identification of the first inventory item 114(1) from the operator 112, the management module 106 may identify the inventory holder 110(3), select the mobile drive 108(3), and transmit information identifying the inventory holder 110(3) to the mobile drive unit 108(3). After the management module 106 has transmitted the information identifying the inventory holder 110(3) to the selected mobile drive unit 108(3), appropriate elements of the inventory system 100 may perform appropriate actions to complete the retrieval operation. For example, in particular implementations, the selected mobile drive unit 108(3) may move to the selected inventory holder 110(3). The selected mobile drive unit 108 (3) then couples to the selected inventory holder 110(3). After coupling to the inventory holder 110(3), the selected mobile drive unit 108(3) then moves the selected inventory holder 110(3) to the inventory station 104 or adjacent to the inventory station 104. Once the selected inventory holder 110(3) arrives at the inventory station 104, the operator 112 at the inventory station 104 may process the replenishment request in any appropriate manner. To illustrate, the operator 112 may execute the replenishment operation by storing the first inventory item 114(1) in the selected inventory holder 110(3).

The mobile drive units 108 may represent any devices or components appropriate for use in the inventory system 100 based on the characteristics and configuration of the inventory holders 110 and/or other elements of the inventory system 100. In some implementations of the inventory system 100, the mobile drive units 108 are independent, self-powered robotic devices that may move freely about the warehouse, under their own direction or through coordination by the management module 106. In alternative implementations, the mobile drive units 108 may be configured to move inventory holders 110 along tracks, rails, cables, or other guidance elements traversing the associated workspace. In such implementations, mobile drive units 108 may receive power through a connection to the guidance elements, such as a powered rail. In some embodiments, the inventory system 100 may include two or more different types of mobile drive units 108 having various capabilities and specifications. Moreover, although illustrated and discussed as though mobile drive units 108 are a particular type of mobile drive unit, mobile drive units 108 may refer to various types of mobile drive units. For example, one type of mobile drive unit 108 may be operable to transport relatively large, heavy, or bulky inventory items. Another type of mobile drive unit 108 may be operable to transport relatively lighter and/or more compact inventory items. Mobile drive units 108 may accordingly have various power trains, load capacities, and other appropriate specifications to transport particular inventory items in various types of the inventory holders 110 within the inventory system 100.

The mobile drive units 108 transport the inventory holders 110 between any number of predefined physical locations on the warehouse floor. For instance, the mobile drive units 108 may transport the inventory holders 110 between the storage region 102 and the inventory station 104. For illustration purposes, rectangular areas are depicted in FIG. 1 to designate physical locations within the facility that may be used to place an associated inventory holder. Each location may accommodate an inventory holder 114. That is, each inventory holder 110 may stand at rest within the area of the floor reserved or otherwise predefined as a storage location 118. The storage region 102, for example, has multiple storage locations 118 arranged in sets of nine storage locations with aisles between the sets. An inventory holder 110 may be placed within a corresponding storage location 118 until needed by the operator 112 at the inventory station 104. In other layouts, there may be more or less than nine storage locations per zone in the storage region 102.

The mobile drive units 108 may be capable of communicating with the management module 106 to receive information identifying selected inventory holders 110, transmit the locations of mobile drive units 108, or exchange any other suitable information to be used by the management module 106 or mobile drive units 108 during operation. The mobile drive units 108 may communicate with the management module 108 wirelessly, using wired connections between mobile drive units 108 and management module 106, and/or in any other appropriate manner. As one example, the mobile drive unit 108 may communicate with the management module 106 and/or with another mobile drive unit 108 using 802.11, Bluetooth, or Infrared Data Association (IrDA) standards, or any other appropriate wireless communication protocol. As another example, in a tracked inventory system 100, tracks or other guidance elements upon which the mobile drive units 108 move may be wired to facilitate communication between the mobile drive units 108 and other components of the inventory system 100. In general, mobile drive units 108 may be propelled and controlled in any manner appropriate based on the configuration and characteristics of the inventory system 100.

Thus, FIG. 1 illustrates an example inventory system 100 that may allow for automated tracking of inventory items that are added to or removed from inventory holders by an operator at an inventory station (e.g., as part of a user-directed replenishment operation).

Figure 2:
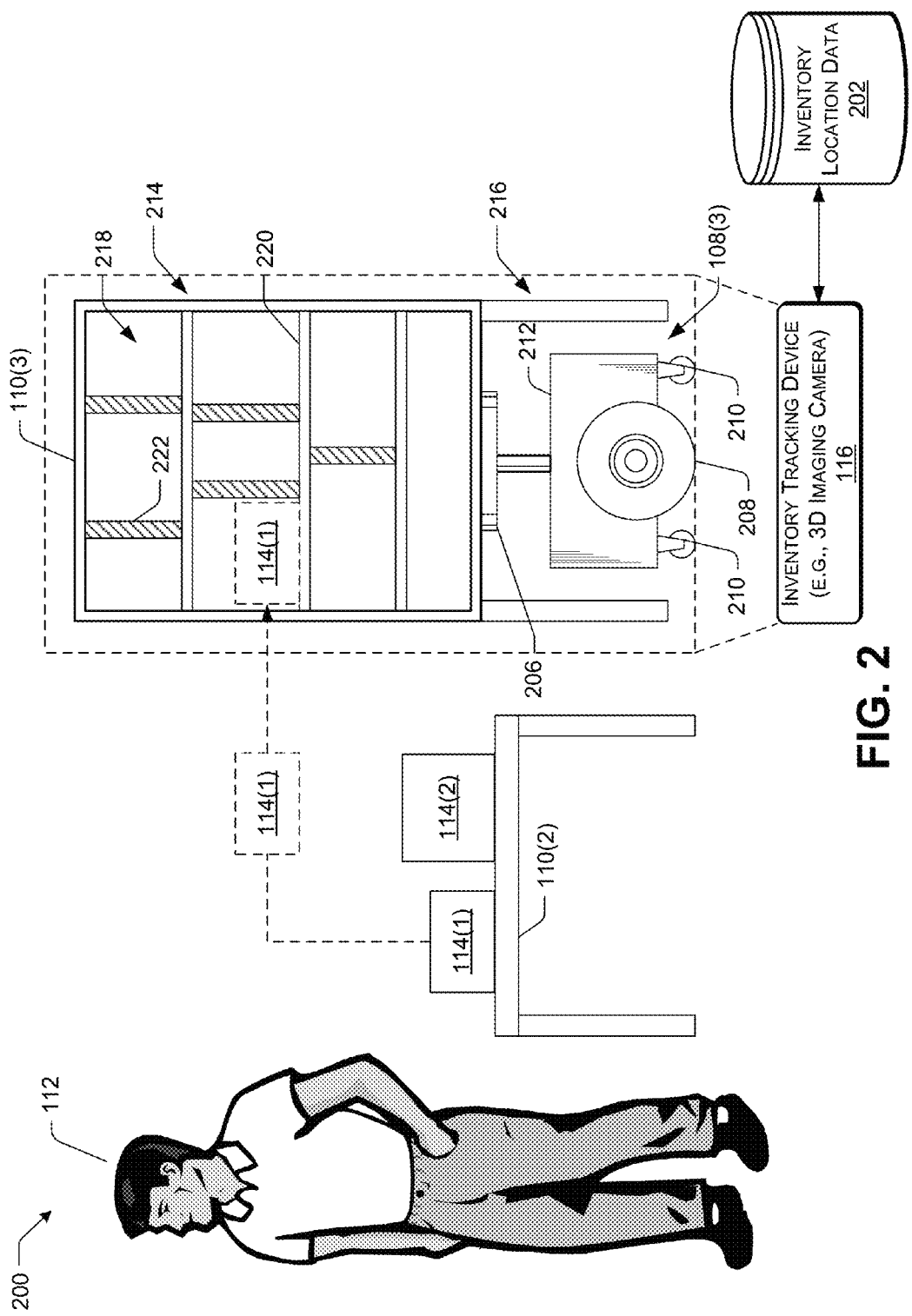
FIGS. 2 and 3 show side views of an example mobile drive unit and inventory holders employed in the inventory system.

FIG. 2 illustrates a side-view illustration 200 of a mobile drive unit 108 and inventory holders 110 employed in the inventory system 100. FIG. 2 illustrates a particular implementation of a user-directed replenishment operation that includes movement of the first inventory item 114(1) from the free-standing inventory holder 110(2) (e.g., a table) to the inventory holder 110(3) that is loaded on the drive unit 108(3).

In some implementations, the operator 112 may select the first inventory item 114(1) from the free-standing inventory holder 110(2). The operator 112 may then scan a barcode associated with the first inventory item 114(1) to identify the first inventory item 114(1) to be tracked and may move the first inventory item 114(1) to the inventory holder 110(3) that is loaded on the drive unit 108(3). As explained above, the inventory tracking device 116 may employ various methods, such as a 3D sensing camera or a position sensing device, to determine that the first inventory item 114(1) has been moved to the inventory holder 110(3) and to identify the particular location (e.g., a bin) on the inventory holder 110(3) where the first inventory item 114(1) has been placed. The inventory tracking device 116 may store the location information as inventory location data 202. As an illustrative example, the inventory location data 202 may include an inventory item identifier associated with the first inventory item 114(1), an inventory holder identifier associated with the inventory holder 110(3) where the first inventory item 114(1) has been stored, and a bin identifier that identifies a particular bin of the inventory holder 110(3) where the first inventory item 114(1) has been stored.

In some implementations, the inventory holder 110 may comprise any number of faces with similar or different structure. As illustrated, the inventory holder 110 includes a frame 214 and a plurality of legs 216. In the example illustrated in FIG. 2, one inventory holder 110(2) is at rest in a first location next to the operator 112. While FIG. 2 illustrates an example of a table being used as the free-standing inventory holder 110(2), it will be appreciated that the inventory holder 110(2) may include multiple shelves that support a variety of items 114. The inventory holder 110(2) may have open side faces to facilitate stocking of the items 114 onto the shelves and picking of items from the shelves.

The inventory items 114 represent any objects suitable for storage, retrieval, and/or processing in an automated inventory system 100. For example, a given inventory item may represent a single stock-keeping unit (SKU) of a unique inventory item. Thus, inventory items may refer to a particular item and/or may refer to a quantity of items having a particular SKU as appropriate. As one example, the inventory system 100 may represent a retail distribution warehouse that stores bulk inventory items 114 for retail facilities, such as grocery stores and/or merchandise warehouses. As another example, the inventory system 100 may represent an e-commerce warehouse facility, and inventory items 114 may represent merchandise stored in the warehouse facility.

The mobile drive units 108 may transport the inventory holders 110 by docking with and/or coupling to a particular holder and moving the holder while docked. For example, as illustrated, the mobile drive unit 108(3) transports inventory holder 110(3) by moving beneath the inventory holder 110(3) and lifting a docking head 206 that interfaces with a bottom surface (or other portion) of inventory holder 110(3). The docking head 206 may be controlled by an actuator of the mobile drive unit 108 operable to lift the inventory holder 110 when docked. The docking head 206 may couple the mobile drive unit 108 to the inventory holder 110 or otherwise support the inventory holder 110 during transportation. The docking head 206 may also include any appropriate features to facilitate coupling to the inventory holder 110. For example, in some implementations, a high-friction element may form all or a portion of the docking head 206, which abuts a portion of the inventory holder 110 while docked. In such embodiments, frictional forces created between the high-friction element of the docking head 206 and a surface of the inventory holder 110 may induce translational and rotational movement when docked.

The mobile drive unit 108 may utilize the docking head 206 to maneuver the inventory holder 110, such as by lifting, rotating, and/or moving the inventory holder 110 in any appropriate manner. In some implementations, the mobile drive unit 108 may be capable of rotating its docking head to rotate the inventory holder 110 while moving and/or while stopped. In addition or in the alternative, the mobile drive unit 108 may be capable of rotating the docking head 206 independently or as a part of the movement of the mobile drive unit 108 as a whole. For example, the mobile drive unit 108 may rotate the inventory holder 110 as the mobile drive unit 108 executes a turn such that the inventory holder 110 continues to face the original direction of movement.

The mobile drive unit 108 is further equipped with multiple drive wheels 208 and multiple stabilizer wheels 210. A motor internal of a body 212 is used to power the drive wheels 208, while the stabilizer wheels 210 provide stability to the drive unit 108 to maintain balance of the coupled inventory holder 110. Using the drive wheels 208, the mobile drive unit 108 may transport the inventory holder 110 while the docking head 206 is lifting inventory holder 110 or otherwise move the mobile drive unit 108 when the inventory holder 110 is undocked.

It should be noted that while a particular method of docking with the inventory holder 110 is illustrated, the mobile drive unit 108 may dock with the inventory holder 110 by connecting to, lifting, and/or otherwise interacting with the inventory holder 110 in any other suitable manner so that, when docked, the mobile drive unit 108 are coupled to and/or support inventory holder 110 and can move inventory holder 110. Further, in some embodiments, the mobile drive units 108 may not dock with the inventory holders 110, but rather may remain continually mated with a particular inventory holder 110.

The frame 214 holds inventory items 114 and provides storage space for storing inventory items 114 external or internal to the frame 214. For ease of illustration of the movement of inventory items between inventory holders 110, only the first inventory item 114(1) is shown in the inventory holder 110(3). However, it will be appreciated that the inventory holder 110(3) may already store additional inventory items before the operator 112 places the first inventory item 114(1) on the inventory holder 110(3). The storage space provided by the frame 214 may be divided into a plurality of inventory bins 218, each capable of holding inventory items 114. The inventory bins 218 may include any appropriate storage elements, such as bins, compartments, or hooks.

In some implementations, the frame 214 includes a plurality of trays 220 stacked upon one another and attached to or stacked on a base. In such cases, the inventory bins 218 may be formed by a plurality of adjustable dividers 222 that may be moved to resize one or more inventory bins 218. Alternatively, the frame 214 may represent a single inventory bin 218 that includes a single tray 220 and no adjustable dividers 222. Additionally, in some examples, the frame 214 may represent a load-bearing surface mounted on a mobility element (not shown). The inventory items 114 may be stored on such an inventory holder 110 by being placed on the frame 214. In general, the frame 214 may include storage internal and/or external storage space divided into any appropriate number of inventory bins 218 in any appropriate manner.

Additionally, in some implementations, the frame 214 may include a plurality of device openings that allow the mobile drive unit 108 to position the docking head 206 adjacent to the docking surface. The size, shape, and placement of the device openings may be determined based on the size, the shape, and other characteristics of the particular mobile drive unit 108 and/or inventory holder 110 utilized by the inventory system 100. For example, in the illustrated example, the frame 214 includes four legs 216 that form device openings and allow the mobile drive unit 108 to be positioned under the frame 214 and adjacent to the docking surface. The length of the legs 216 may be determined based on a height of the mobile drive unit 108.

Thus, FIG. 2 illustrates that the inventory tracking device 116 may track the movement of inventory items 114 and store location information as inventory location data 202 to identify the particular bin of an inventory holder where the inventory item 114 has been stored.

Figure 3:
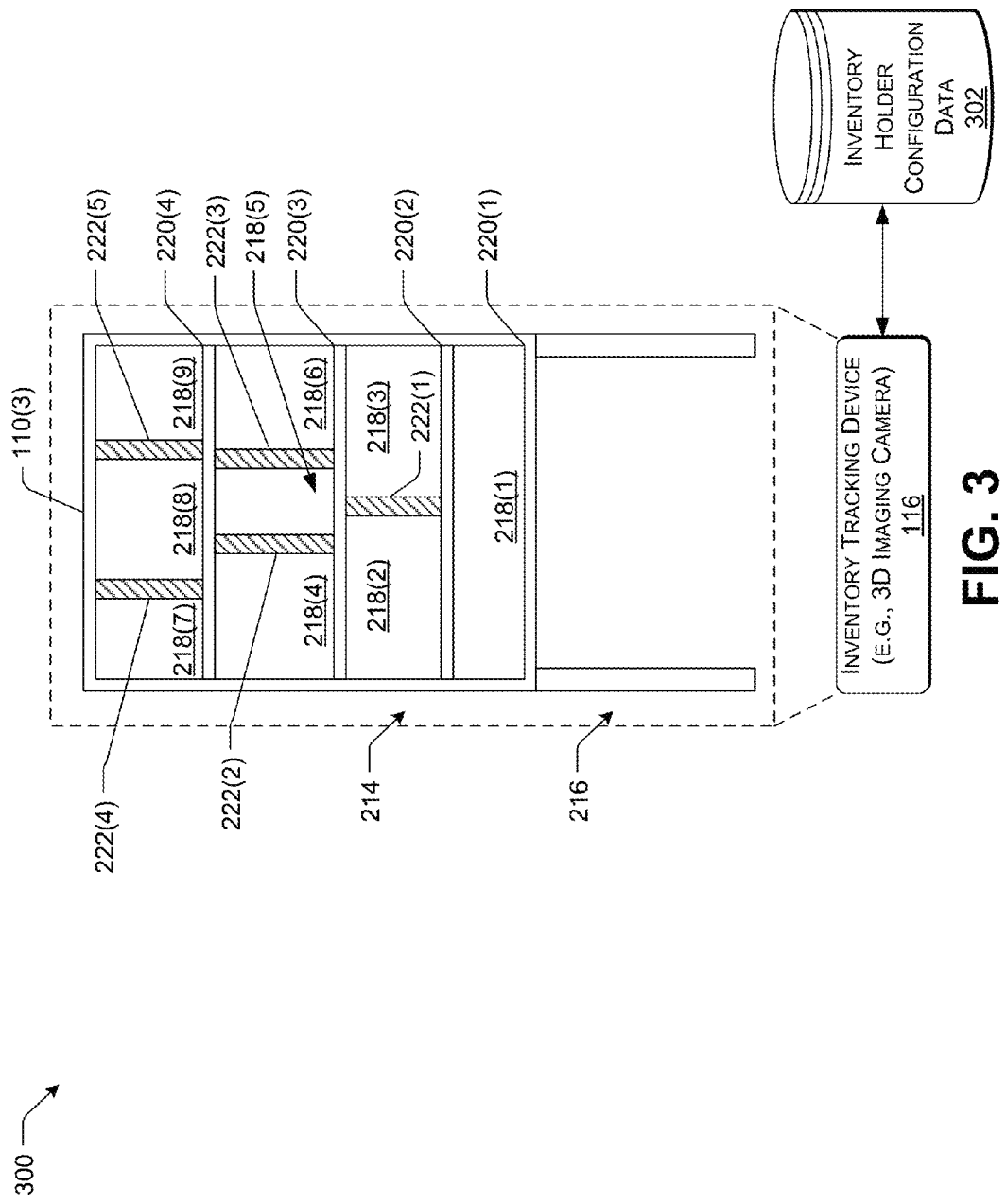

FIG. 3 illustrates an example of identifying or verifying a configuration of an inventory holder 110 using the inventory tracking device 116 according to some implementations.

As explained above, inventory holders 110 may comprise any number of faces with similar or different structure. In the example illustrated in FIG. 3, the inventory holder 110(3) includes the frame 214 and the plurality of legs 216. The storage space provided by the frame 214 may be divided into the plurality of inventory bins 218, each capable of holding inventory items 114 (not shown in FIG. 3). The inventory bins 218 may include any appropriate storage elements, such as bins, compartments, or hooks. The frame 214 includes the plurality of trays 220 stacked upon one another and attached to or stacked on a base. In such cases, the inventory bins 218 may be formed by the plurality of adjustable dividers 222 that may be moved to resize the one or more inventory bins 218. The inventory items 114 may be stored on the inventory holder 110(3) by being placed on the frame 214. In general, the frame 214 may include internal and/or external storage space divided into any appropriate number of inventory bins 218 in any appropriate manner.

In some implementations, the inventory tracking device 116 may determine an initial configuration of the inventory holder 110(3). For example, the location of each of the inventory bins 218 may be identified using a 3D sensing camera. To illustrate, the 3D sensing camera may be configured to identify a size and shape of the frame 214, a size and shape of the legs 216, a location of each of the trays 220, and a location of each of the dividers 222, among other alternatives. Based on this information, a size and a location of each of the inventory bins 218 of the inventory holder 110(3) may be determined. The inventory tracking device 116 may store configuration information associated with the inventory holder 110(3) as inventory holder configuration data 302.

In the illustrative example of FIG. 3, the inventory tracking device 116 may identify a first tray 220(1), a second tray 220(2), a third tray 220(3), and a fourth tray 220(4). The inventory tracking device 116 may further determine that no dividers are associated with the first tray 220(1), one divider 222(1) is associated with the second tray 220(2), two dividers 222(2) and 222(3) are associated with the third tray 220(3), and two dividers 222(4) and 222(5) are associated with the fourth tray 220(4). Based at least in part on this information, the inventory tracking device 116 may determine that the first tray 220(1) includes one bin 218(1), the second tray 220(2) includes two bins 218(2) and 218(3), the third tray 220(3) includes three bins 218(4), 218(5) and 218(6), and the fourth tray 220(4) includes three bins 218(7), 218(8) and 218(9). The inventory tracking device 116 may store this information in the inventory holder configuration data 302 as configuration information associated with the inventory holder 110(3).

It will be appreciated that the inventory tracking device 116 may not only determine an initial configuration of the inventory holder 110(3) but also verify that the configuration information associated with the inventory holder 110(3) that is stored in the inventory holder configuration data 302 is correct.

Thus, FIG. 3 illustrates that the inventory tracking device 116 may not only determine that inventory items have been added to or removed from an inventory holder but also may identify or verify a configuration of the inventory holder (e.g., an "empty" inventory holder without any inventory items).

Figure 4:
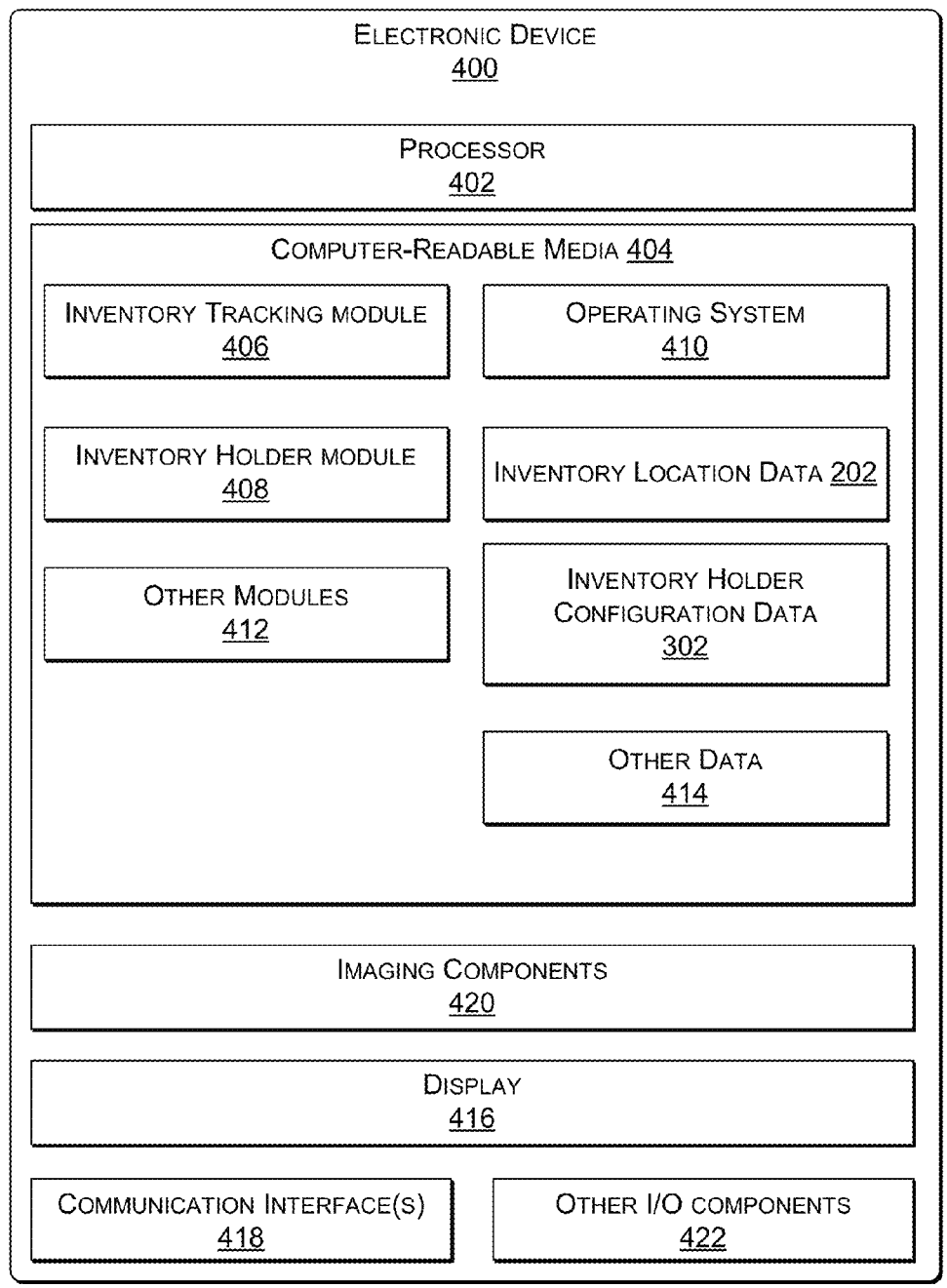
FIG. 4 is a block diagram of select components of an example inventory tracking device used in the inventory system of FIG. 1.

FIG. 4 illustrates select example components of an electronic device 400 (e.g., the inventory tracking device 116 of FIG. 1) that may be used to implement the functionality described above according to some implementations. In a very basic configuration, the electronic device 400 includes, or accesses, components such as at least one processor 402 and a computer-readable media 404. Each processor 402 may itself comprise one or more processors or cores. The processor(s) 402 can be configured to fetch and execute computer-readable instructions stored in the computer-readable media 404 or other computer-readable media.

Depending on the configuration of the electronic device 400, the computer-readable media 404 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 402 directly or through another computing device. Accordingly, the computer-readable media 404 may be computer-readable media able to maintain instructions, modules or components executable by the processor 402.

The computer-readable media 404 may be used to store any number of functional components that are executable by the processor 402. In some implementations, these functional components comprise instructions or programs that are executable by the processor 402 and that, when executed, implement operational logic for performing the actions attributed above to the electronic device 400. Functional components of the electronic device 400 stored in the computer-readable media 404 may include an inventory tracking module 406 which may be executed on the processor 402 to perform operations as described above with reference to FIGS. 1 and 2. The functional components may also include an inventory holder module 408 to perform operations as described above with reference to FIGS. 1 and 3. Other functional components may include an operating system 410 for controlling and managing various functions of the electronic device 400. Depending on the type of the electronic device 400, the computer-readable media 404 may also optionally include other functional components, such as other modules 412, which may include applications, programs, drivers and so forth.

The computer-readable media 404 may also store data, data structures, and the like that are used by the functional components. For example, data stored by the computer-readable media 404 may include the inventory location data 202 described with respect to FIG. 2 and the inventory holder configuration data 302 described with respect to FIG. 3. The electronic device 400 may also include other data 414, which may include, for example, data used by the operating system 410 and the other modules 412. Further, the electronic device 400 may include many other logical, programmatic and physical components, of which those described are merely examples that are related to the discussion herein.

FIG. 4 further illustrates a display 416, such as a liquid crystal display, plasma display, light emitting diode display, organic light emitting diode display, and so forth. One or more communication interfaces 418 may support both wired and wireless connection to various networks, such as cellular networks, radio, WiFi networks, short-range or near-field networks (e.g., Bluetooth®), infrared signals, local area networks, wide area networks, the Internet, and so forth. The communication interface 418 may further allow a user to access storage on another device, such as a user's computing device, a network attached storage device, or the like.

The electronic device 400 may further be equipped with various image components 420 (e.g., three-dimensional and/or two-dimensional) and various other input/output (I/O) components 422. Such I/O components may include a touch-screen and various user actuatable controls (e.g., buttons, a joystick, a keyboard, a mouse, etc.), speakers, a microphone, a camera, connection ports, and so forth. For example, the operating system 410 of the electronic device 400 may include suitable drivers configured to accept input from a keypad, keyboard, or other user actuatable controls and devices included as the I/O components 422. For instance, the user actuatable controls may include page turning buttons, navigational keys, a power on/off button, selection keys, and so on. Additionally, the electronic device 400 may include various other components that are not shown, examples of which include removable storage, a power source, such as a battery and power control unit, a global positioning system (GPS) device, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 5:
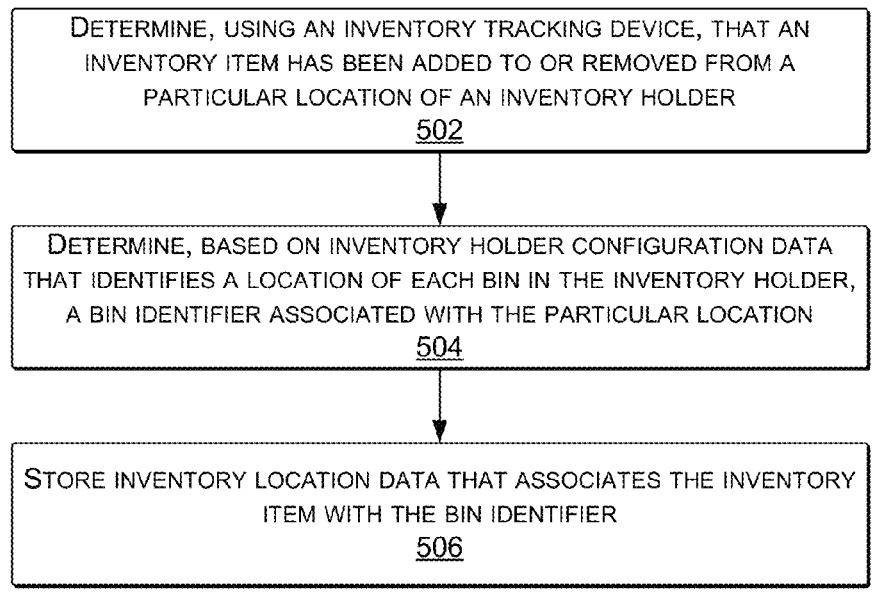
FIG. 5 is a flow diagram illustrating an example inventory management process that may be implemented by the inventory system.

FIG. 5 illustrates an example process 500 for automated inventory management, as described above. FIG. 5 illustrates the process 500 as a collection of blocks in a logical flow diagram, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures and environments described in the examples herein, although the processes may be implemented in a wide variety of other architectures or environments.

At 502, the process 500 includes determining, using an inventory tracking device, that an inventory item has been added to or removed from a particular location of an inventory holder of an inventory system. The inventory holder may include one or more trays to store one or more inventory items, and each tray may include one or more bins. As an illustrative example, referring to FIG. 1, the inventory tracking device 116 may determine that the first inventory item 114(1) has been added to or removed from a particular location on the inventory holder 110(3). As further illustrated in FIGS. 2 and 3, the inventory holder 110(3) may include a plurality of trays 220 to store one or more inventory items 114, and each tray 220 may include one or more bins 218.

At 504, the process 500 includes determining, based on inventory holder configuration data that identifies a location of each bin in the inventory holder (and free from input from an operator), a bin identifier that is associated with the particular location of the inventory holder. As an illustrative example, referring to FIG. 3, the bin identifier associated with the particular location may be determined based on the inventory holder configuration data 302.

At 506, the process 500 includes storing inventory location data that associates the inventory item with the bin identifier. As an illustrative example, referring to FIG. 2, the inventory item 114(1) may be associated with the bin identifier of the location on the inventory holder 110(3) where the inventory item 114(1) was placed by the operator 112 and stored in the inventory location data 202.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims

What is claimed is:

1. An inventory system comprising:
a plurality of inventory holders comprising at least a first inventory holder and a second inventory holder, wherein the first inventory holder and the second inventory holder include one or more bins to store one or more inventory items;
a plurality of mobile drive units that are remotely controllable to transport the plurality of inventory holders;
an inventory tracking device, wherein the inventory tracking device is separate from the plurality of inventory holders and is configured to:
    determine, free from input from an operator, configuration data for the first inventory holder, wherein the configuration data comprises a location of individual bins in the first inventory holder;
    determine that a first inventory item has been added to a particular location on the first inventory holder;
    determine, based on the configuration data for the first inventory holder, a first bin identifier that is associated with the particular location on the inventory holder;
    determine, free from input from an operator, configuration data for the second inventory holder, wherein the first inventory holder is separate from the second inventory holder, and wherein the configuration data comprises a location of individual bins in the second inventory holder;
    determine that a second inventory item has been added to a particular location on the second inventory holder;
    determine, based on the configuration data for the second inventory holder, a second bin identifier that is associated with the particular location on the second inventory holder; and
    store inventory location data that associates the first inventory item with the first bin identifier and the second inventory item with the second bin identifier.

2. The inventory system as recited in claim 1, wherein the inventory tracking device is further configured to determine that the first inventory item has been added to the particular location on the first inventory holder by detecting movement of the operator at the particular location.

3. The inventory system as recited in claim 1, wherein the inventory tracking device includes a position sensing device that is configured to determine that the first inventory item has been added to the first inventory holder.

4. The inventory system as recited in claim 3, wherein the position sensing device determines that the first inventory item has been added to the first inventory holder in response to the operator selecting a button or other control on the position sensing device while at the particular location on the first inventory holder.

5. The inventory system as recited in claim 1, wherein the inventory tracking device is further configured to verify that the configuration data for the first inventory holder is correct.

6. A method comprising:
under control of one or more processors of an electronic device specifically configured with executable instructions,
determining, free from input from an operator and by an inventory tracking device which is separate from at least a first inventory holder and a second inventory holder, configuration data for the first inventory holder, wherein the configuration data comprises a location of one or more bins in the first inventory holder;
determining, at least in part by the inventory tracking device, that a first inventory item has been added to a particular location on the first inventory holder or removed from the particular location on the first inventory holder;
determining, based on the configuration data for the first inventory holder, a first bin identifier that is associated with the particular location on the first inventory holder;
determining, free from input from the operator and by the inventory tracking device, configuration data for the second inventory holder, wherein the first inventory holder is separate from the second inventory holder, and wherein the configuration data comprises a location of one or more bins in the second inventory holder;
determining, at least in part by the inventory tracking device, that a second inventory item has been added to a particular location on the second inventory holder or removed from the particular location on the second inventory holder;
determining, based on the configuration data for the second inventory holder, a second bin identifier that is associated with the particular location on the second inventory holder; and
storing inventory location data that associates the first inventory item with the first bin identifier and the second inventory item with the second bin identifier.

7. The method as recited in claim 6, wherein the inventory tracking device includes an imaging device that monitors the first inventory holder to update the inventory location data in response to a third inventory item being added to the first inventory holder or removed from the first inventory holder.

8. The method as recited in claim 7, wherein the imaging device determines that the third inventory item has been added to the first inventory holder or removed from the first inventory holder by comparing a first image of the first inventory holder prior to an addition or a removal of the third inventory item to a second image of the first inventory holder after the addition or the removal of the third inventory item.

9. The method as recited in claim 6, wherein the first inventory holder is coupled to a mobile drive unit and is located at an inventory station of an inventory system.

10. The method as recited in claim 9, wherein the first inventory item is transferred from a stationary inventory holder at the inventory station to the first inventory holder coupled to the mobile drive unit, and wherein the method further includes:
identifying, via a barcode scanner located at the inventory station, the first inventory item, wherein the barcode scanner is separate from the inventory tracking device.

11. The method as recited in claim 9, wherein the mobile drive unit moves the first inventory holder to a storage location of the inventory system after the first inventory item has been added to the first inventory holder at the inventory station or removed from the first inventory holder at the inventory station.

12. The method as recited in claim 6, wherein the first inventory item is added to the particular location on the first inventory holder as part of a user-directed replenishment operation.

13. The method as recited in claim 12, wherein the operator scans a visual identifier on the first inventory item prior to adding the first inventory item to the first inventory holder.

14. The method as recited in claim 13, wherein the first inventory holder does not include a scannable barcode at the particular location.

15. The method as recited in claim 12, wherein a management module of an inventory system directs a mobile drive unit to retrieve the first inventory holder from a storage location of the inventory system.

16. The method as recited in claim 6, wherein the inventory tracking device is configured to identify one or more gestures of the operator that are associated with the first inventory item being added to the first inventory holder or removed from the first inventory holder.

17. The method as recited in claim 16, wherein:
the inventory tracking device includes an imaging device that compares a first image to a second image to identify a gesture of the operator and a location of the gesture with respect to the first inventory holder; and
the particular location on the first inventory holder is determined based at least in part on the location of the gesture with respect to the first inventory holder.

18. One or more computer-readable media maintaining instructions executable by one or more processors to perform operations comprising:
determining, using an imaging device separate from a first inventory holder of an inventory system, a configuration of the first inventory holder, wherein the configuration comprises:
one or more trays to store one or more inventory items included on the first inventory holder, each tray of the one or more trays including one or more bins; and
one or more dividers associated with each tray of the one or more trays, the one or more bins associated with each tray defined by the one or more dividers;
determining, using an imaging device separate from a second inventory holder of the inventory system, a configuration of the second inventory holder, wherein the first inventory holder is separate from the second inventory holder, and wherein the configuration comprises:
one or more trays to store one or more inventory items included on the second inventory holder, each tray of the one or more trays including one or more bins; and
one or more dividers associated with each tray of the one or more trays, the one or more bins associated with each tray defined by the one or more dividers;
storing the configuration of the first inventory holder as first inventory holder configuration data, wherein the first inventory holder configuration data identifies a location of each bin in the first inventory holder and a bin identifier associated with each bin in the first inventory holder, and
storing the configuration of the second inventory holder as second inventory holder configuration data, wherein the second inventory holder configuration data identifies a location of each bin in the second inventory holder and a bin identifier associated with each bin in the second inventory holder.

19. The one or more computer-readable media as recited in claim 18, the operations further comprising:
determining that a first inventory item has been added to a particular location on the first inventory holder or removed from the particular location on the first inventory holder; and
determining, based on the first inventory holder configuration data and free from an input from an operator, that the first inventory item has been added to or removed from a particular bin that is associated with the particular location on the first inventory holder.

20. The one or more computer-readable media as recited in claim 18, the operations further comprising verifying, using the imaging device, the configuration of the first inventory holder.

* * * * *